March 7, 1950 W. VUTZ 2,500,104
GUIDING CLIP FOR RECIPROCATING CUTTERS
Filed May 11, 1945
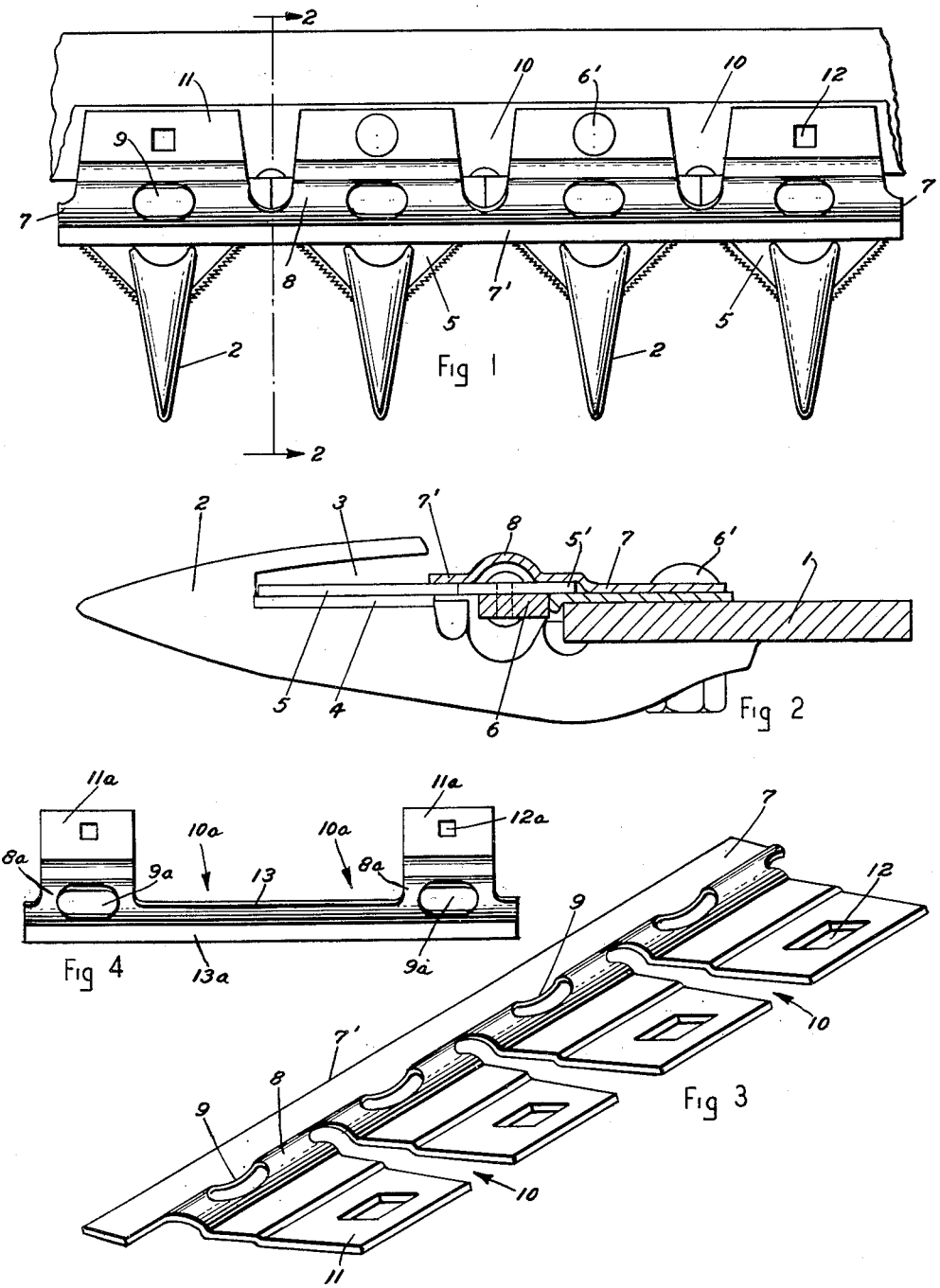
INVENTOR.
Wilhelm Vutz
BY F. L. Walker Atty.

Patented Mar. 7, 1950

2,500,104

UNITED STATES PATENT OFFICE 2,500,104

GUIDING CLIP FOR RECIPROCATING CUTTERS

Wilhelm Vutz, Coldwater, Ohio, assignor, by mesne assignments, to Avco Manufacturing Corporation, a corporation of Delaware Application May 11, 1945, Serial No. 593,190

2 Claims. (Cl. 56—305)

This invention pertains to harvesting and mowing machines of the reciprocatory cutter bar type, and more particularly to a guide and hold down strip for the movable cutter blades.

The cutter blade assembly of such machines is subject to deflection and unalignment, with resulting friction, wear, and increased power requirement by accumulation and impaction of debris, consisting of vegetable fibers and pulp intermixed with dirt and soil adjacent to the reciprocatory cutter blades and in crevices and bearing areas thereof.

There is therefore contemplated in the present instance a continuous bearing support, in the form of a guide and hold down strip, for the reciprocatory cutter blades which will normally resist deflection or displacement of the cutter blades out of straight line path of travel. The exclusion of a considerable portion of vegetable debris from the bearing area is also contemplated, as is the provision for escape of portions of such debris as may accumulate within this area. While the bearing support is sufficiently rigid to normally resist deflection of the cutter blades from a straight path, the guide and hold down strip is rendered amply flexible and resilient to yield locally to excessive pressure.

The object of the invention is to improve the construction as well as the means and mode of operation of reciprocatory type cutter bar assemblies, whereby they may not only be economically manufactured, but will be more efficient in use, uniform in operation, having minimum working parts, and be unlikely to get out of repair.

A further object of the invention is to maintain a uniform straight line path of travel of the cutter blades and prevention of deflection thereof by accumulation and impaction of vegetable fibers and pulp, and other foreign matter.

A further object of the invention is to provide a continuous guide and hold down member and elongated uniformly tensioned bearing for the reciprocatory cutter blades.

A further object of the invention is to decrease friction and wear, and thereby minimize the power requirement necessary to operate the reciprocatory blades.

A further object of the invention is to provide an escape route for entrapped vegetable debris.

A further object of the invention is to provide a cutter blade guide and hold down means possessing the advantageous structural features and inherent meritorious characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the drawings, wherein is illustrated the preferred but not necessarily the only form of embodiment of the invention, Fig. 1 is a plan view of a fragmentary portion of a harvesting or mowing machine cutter bar assembly, embodying the present invention.

Fig. 2 is a transverse sectional view taken along line 2—2 of Fig. 1.

Fig. 3 is a perspective view of the improved cutter guide and hold down strip forming the subject matter hereof.

Fig. 4 is an enlarged detail plan view of a modification.

Like parts are indicated by similar characters of reference throughout the several views.

Referring to the drawings, 1 indicates the mounting bar of a conventional cutter bar assembly for a harvesting or mowing machine on which are mounted a succession of forwardly directed tapered guard fingers 2 horizontally slotted at 3 to provide ample clearance space for cooperating shear blades. Located on the bottom of the slot 3 of each guard finger is a stationary shear blade 4. Overlying the stationary shear blades 4 is a series of triangular sharpened cutter blades 5 which are interconnected for unison reciprocation by an underlying bar 6 common to the series of blades 5 and actuated to and fro by the harvester or mower mechanism. It has been customary to provide separate remotely spaced guide fingers at comparatively widely spaced intervals which bear upon the reciprocating cutter blades 5.

However, it is found that the accumulation of vegetable fibers and pulp and other foreign matter impacted within the slots 3 and beneath the cutter blades 5 exerts considerable force upwardly, tending to raise the cutter blades away from the stationary shear blades 4 and deflect the series of interconnected reciprocatory cutter blades 5 out of straight line travel into increased frictional wiping engagement with the remotely spaced overhanging guide fingers. This not only increases frictional resistance to operation of the cutter bar assembly, but also causes greatly increased wear.

To overcome this difficulty, there is herein provided an elongated guide and hold down strip 7 of spring steel fixedly secured to the mounting bar 1 of the bolts 6' positioned through openings 12 adjacent the rear of the guide and having its forward and free margin on bearing surface 7' overhanging and bearing upon the series of traveling cutter blades 5 throughout its full length. The strip 7 is formed with an inverted concavo convex channel 8 in overlying relation with the traveling cutter blades 5.

Disposed at regularly spaced intervals in the channel 8 of the guide and hold down strip 7 is a series of openings 9 through which portions of the accumulations of vegetable fiber and pulp and other foreign material may escape, thus relieving the pressure on the cutter blades 5. The openings 9 are preferably, but not necessarily, spaced in approximately uniform relation with the relatively spaced guard fingers 2. At regular intervals, approximately but not necessarily midway between the spaced guard fingers 2, the strip 7 is transversely slotted or notched as at 10, thus somewhat increasing the flexibility of the guide and hold down strip 7, enabling it to locally yield slightly to excessive pressure. The marginal bearing edge 7' of the strip 7, however, maintains its continuous bearing contact with the traveling cutter blades 5.

The cutter blade guide and hold down strip 7 described provides a continuous slide bearing for the cutter blades resistant to excessive deflecting influences encountered in tractor operation, thereby assuring better shearing action under all conditions. The guide and hold down strip 7 is amply rigid and resistant to hold the cutter blades down for normal cutting action, but sufficiently resilient and yielding locally to compensate for hard growths, wire or other foreign material accidentally encountered and engaged beneath the cutter blades. The transverse slots 10 enable such local yielding action. The transverse slots 10, together with the spaced openings 9, permit accumulated debris and crushed vegetable matter to automatically escape during operation and thus prevent undue friction and minimize binding pressure upon the reciprocatory cutter blades.

While it is preferred that the hold down strip 7 be continuous throughout substantially the full length of the cutter bar assembly, this is not at all essential. For economy of manufacture and replacement, it may comprise a series of relatively short separable sections, such as illustrated in Fig. 4. While in Figs. 1 and 3 the transverse slots 10 are shown as being comparatively narrow, affording closely spaced wide attachment arms 11, the spaced transverse slots 10 may be made materially wider, as shown at 10a in Fig. 4, in which case the arms 11a are therefore more widely spaced and may be of less width than previously described. However, the bearing margin 13a of the hold down strip 13 is elongated and continuous, and is common to a plurality of the supporting arms 11a, however spaced. The modification shown in Fig. 4, particularly arms 11a, as in arms 11 of Figs. 1 to 3 inclusive, have square holes 12a formed therein for the similar purpose of immovably securing the rear end of the guide bar strip to the mounting bar 1. The strip 13 includes a concave convex channel 8a and openings 9a similar to the channel 8 and openings 9 of Figs. 1 through 3.

In normal operation the resiliency of the arms 11—11a, whether closely spaced as in Fig. 3 or more widely separated as in Fig. 4, is amply sufficient to resist deflection or buckling of the series of cutter blades 5. However, in the event a hard and tough stock or growth is encountered and bent over and caught between the blades 4 and 5, there is a tendency for the blade 5 to fulcrum on their heels 5' (toward the right of Fig. 2) and thus locally elevate the blades 5 against the tension of the present bearing and hold down unit, the yielding of which minimizes breakage and prevents permanent deformation of the cutter blades 5 and supporting bar 6. The guide and hold down unit is so proportioned that the contact portion 7' bears upon the blades 5 as far forward and distantly as possible from their heels 5' upon which they tend to fulcrum, thus minimizing the leverage exerted by vegetable fiber and pulp or hard stalks accumulated beneath the cutter blades.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A guide and hold down strip for a harvester or mowing cutter bar assembly of the type having a mounting bar and cutter blades mounted for reciprocatory motion with respect to said cutter bar, said guide strip comprising an elongated strip of metal having a continuous uninterrupted longitudinal marginal bearing area disposed in overhanging contact relation with the reciprocating cutter blades, an inverted channel in said guide strip enclosing a clear unencumbered chamber beneath said strip adapted to receive foreign material from said bearing surface, said guide strip being of uniform width throughout its length and having the rear portion thereof secured against relative movement with respect to said mounting bar at a plurality of spaced attachment points, a series of laterally spaced transverse slots extending from the rear of said guide strip to the rear edge of said bearing area for permitting local displacement of said guide strip, and openings in said channel intermediate said slots for permitting discharge of foreign material from said chamber.

2. A guide and hold down strip for a harvester or mower cutter bar assembly of the type having a mounting bar and cutter blades mounted for reciprocating motion with respect to said cutter bar, said guide strip comprising an elongated strip of spring metal having a continuous uninterrupted longitudinal marginal bearing area disposed in overhanging contact relation with the reciprocating cutter blades, an inverted channel in said guide strip enclosing an unencumbered chamber beneath said strip for receiving foreign material from said bearing surface, said guide strip being of uniform width throughout its length and having the rear portion thereof attached at laterally spaced intervals to said mounting bar and fixed against relative movement with respect to said bar, a series of laterally spaced transverse slots in said guide strip disposed intermediate said points of attachment, said slots extending from the rear of said guide strip to the rear edge of said bearing surface for permitting local flexure of said bearing surface, and openings in said channel intermediate said slots for permitting discharge of foreign material from said chamber.

WILHELM VUTZ.

REFERENCES CITED

The following references are of record in the file of this patent:

UNITED STATES PATENTS

| Number | Name | Date |
|---|---|---|
| 489,062 | Wilson | Jan. 3, 1893 |
| 621,562 | Giffhorn | Mar. 21, 1899 |
| 1,879,195 | Gray | Sept. 27, 1932 |
| 2,024,309 | Smith | Dec. 17, 1935 |
| 2,259,750 | Johnson | Oct. 21, 1941 |